(12) United States Patent
Dexter et al.

(10) Patent No.: US 7,730,087 B2
(45) Date of Patent: Jun. 1, 2010

(54) APPARATUS AND METHOD FOR MATCHING A QUERY TO PARTITIONED DOCUMENT PATH SEGMENTS

(75) Inventors: Jeff Dexter, Tustin, CA (US); Allen James Ratcliffe, Rancho Santa Margarita, CA (US); Eric Soirot, Dana Point, CA (US)

(73) Assignee: Raining Data Corporation, Irvine, CA (US)

( * ) Notice: Subject to any disclaimer, the term of this patent is extended or adjusted under 35 U.S.C. 154(b) by 177 days.

(21) Appl. No.: 10/378,050

(22) Filed: Feb. 28, 2003

(65) Prior Publication Data

US 2004/0172387 A1 Sep. 2, 2004

(51) Int. Cl.
   G06F 7/00 (2006.01)
   G06F 17/30 (2006.01)
(52) U.S. Cl. .................... 707/778; 707/782
(58) Field of Classification Search ............. 797/1, 797/3, 10, 101; 715/513; 709/218, 227
See application file for complete search history.

(56) References Cited

U.S. PATENT DOCUMENTS

| | | | |
|---|---|---|---|
| 5,889,979 A * | 3/1999 | Miller et al. | 713/503 |
| 6,240,410 B1 * | 5/2001 | Wical | 707/4 |
| 6,510,425 B1 * | 1/2003 | Okamoto et al. | 707/3 |
| 7,007,027 B2 * | 2/2006 | Najork et al. | 707/10 |
| 2002/0073116 A1 * | 6/2002 | Middleton | 707/513 |
| 2002/0099685 A1 * | 7/2002 | Takano et al. | 707/1 |
| 2002/0147711 A1 * | 10/2002 | Hattori et al. | 707/3 |
| 2002/0147747 A1 * | 10/2002 | Zaharkin | 707/513 |
| 2003/0115187 A1 * | 6/2003 | Bode et al. | 707/3 |
| 2004/0006740 A1 * | 1/2004 | Krohn et al. | 715/513 |

OTHER PUBLICATIONS

Sacks-Davis et al., "Indexing Documents for Queries on Structure, Content and Attributes", Proceedings of the International Symposium on Digital Medianformation Base, Nov. 26, 1997, pp. 236-245.
EP 04711125.7 Supplementary European Search Report, Jul. 16, 2008.

* cited by examiner

*Primary Examiner*—Cam Y T Truong
(74) *Attorney, Agent, or Firm*—Cooley Godward Kronish LLP

(57) ABSTRACT

A method of answering a query includes deconstructing documents into path segments. Identical path segments from different documents are arranged contiguously to form a set of partitions, where each partition has identical path segments. The structure of a query is then analyzed to find a match with a document. Based upon the analysis, a sub-set of partitions is selected for searching. Content from the query is compared to content within the sub-set of partitions to identify matched content. The matched content has associated structural attributes. The matched content structural attributes are compared to the structure of the query to identify an answer to the query.

20 Claims, 3 Drawing Sheets

Partition_1 : Customer/Company Name_1, Customer/Company Name_2,...
Partition_2 : Customer/Address/Street_1, Customer/Address/Street_2,...
Partition_3 : Customer/Address/City_1, Customer/Address/City_2,...
Partition_4 : Customer/Address/State_1, Customer/Address/State_2,...
Partition_5 : Customer/Address/Zip_1, Customer/Address/Zip_2,...

APPARATUS AND METHOD FOR MATCHING A QUERY TO PARTITIONED DOCUMENT PATH SEGMENTS

BRIEF DESCRIPTION OF THE INVENTION

This invention relates generally to searching for information in digital electronic devices. More particularly, this invention relates to a technique for matching a query to partitioned document segments derived from structured documents.

BACKGROUND OF THE INVENTION

Hypertext Markup Language (HTML), Standard Generalized Markup Language (SGML), and eXtensible Markup Language (XML) are examples of widely used markup languages. These markup languages are used to ascribe structure to the content of a document through the use of tags or element types. Thus, they are referred to as structured documents. XML has grown in popularity because it allows users to define their own tags and document structures. XML is used to create complex documents and to facilitate data exchange and data connectivity.

Querying markup language data is difficult because it involves the structure (e.g., tags) and the content (e.g., data associated with the tags) of the document. Effective markup language querying necessitates effective processing of both structure and content.

Existing technology maintains the markup language structure. This markup language structure is a node tree structure. The node tree structure can be stored using object database technology or hybridized relational technology. In either implementation, complex node tree structures are stored as objects in a database with pointers to adjacent nodes.

There are problems associated with these technologies. For example, since each node is an object and pointers are used, each search path must be completely traversed. This translates into an excessive search space since all intervening nodes between significant nodes must be read and processed.

In view of the foregoing, it would be desirable to provide improved techniques for processing structural documents. In particular, it would be desirable to provide a technique that does not necessitate traversal of node trees. Ideally, such a technique would support linear processing of content. In addition, such a technique would rely upon indirect or inferred structural processing instead of the explicit structural processing associated with prior art techniques.

SUMMARY OF THE INVENTION

An embodiment of the invention includes a method of answering a query. The method includes deconstructing documents into path segments. Identical path segments from different documents are arranged contiguously to form a set of partitions, where each partition has identical path segments. The structure of a query is then analyzed to find a match with a document. Based upon the analysis, a sub-set of partitions is selected for searching. Content from the query is compared to content within the sub-set of partitions to identify matched content. The matched content has associated structural attributes. The matched content structural attributes are compared to the structure of the query to identify an answer to the query.

An alternate embodiment of the invention partitions documents into path segments. Identical path segments from different documents are arranged contiguously to form a set of partitions, with each partition having identical path segments. A query is mapped to a selected partition of the set of partitions. Content within the query that matches content in the selected partitions is designated as matched content. An answer is supplied to the query when the matched content structurally corresponds to the query.

The invention also includes a computer readable medium. The computer readable medium has a document partitioner with executable instructions to deconstruct documents into path segments and then arrange identical path segments from different documents contiguously to form a set of partitions, where each partition has identical path segments. The computer readable medium also has a query processor with executable instructions to analyze the structure of a query, select a sub-set of partitions to search, match content from the query to content within the sub-set of partitions to identify matched content, where the matched content has associated structural attributes. The query processor also compares the matched content structural attributes to the structure of the query to identify an answer to the query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
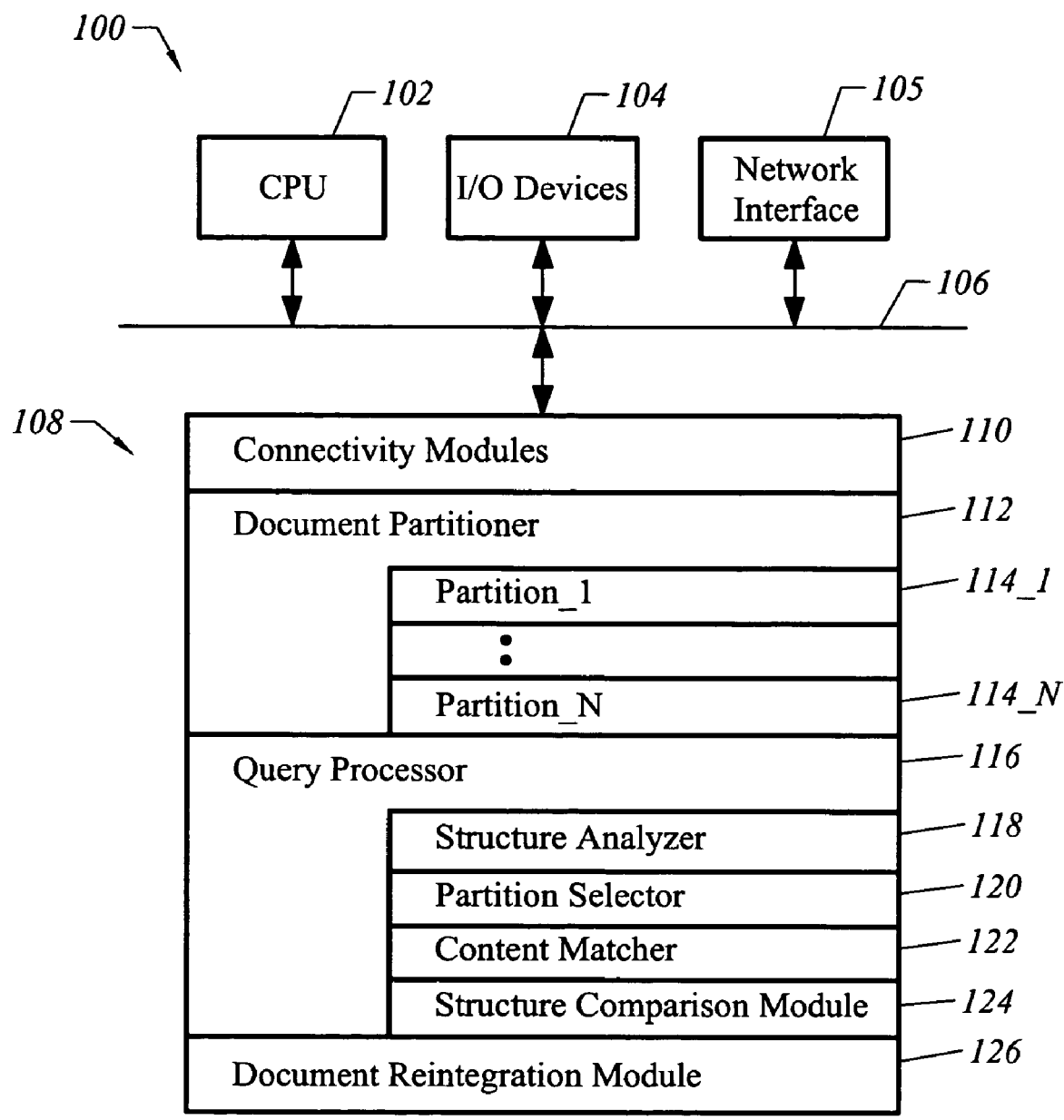
FIG. 1 illustrates a computer implemented in accordance with an embodiment of the invention.

FIG. 1 illustrates a computer 100 implemented in accordance with an embodiment of the invention. The computer 100 includes standard computer components, such as a central processing unit 102 and a set of input/output devices 104. By way of example, the input/output devices 104 include a keyboard, mouse, a display, a printer, and the like. The computer 100 also includes a network interface circuit 105. The network interface 105 provides connectivity to a computer network, such as a local area network, an intranet, the Internet, and the like. The computer 100 can be configured to operate in a client or server mode.

A bus 106 links the central processing unit 102, the input/output devices 104, and the network interface circuit 105. A memory 108 is also connected to the bus. The memory 108 stores executable programs configured in accordance with the invention. The executable modules include connectivity modules 110, which support connectivity in a networked environment. For example, the connectivity modules may include a J2EE module, an HTTP module, a SOAP module, a JAVA module, and the like.

The memory 108 also stores a document partitioner 112. The document partitioner 112 includes executable instructions to deconstruct structured documents into path segments. Identical path segments from different documents are then arranged contiguously to form a set of partitions 114_1 through 114_N, where each partition has identical path segments. The partitions may be stored in a database using conventional techniques.

Figures 2, 3:
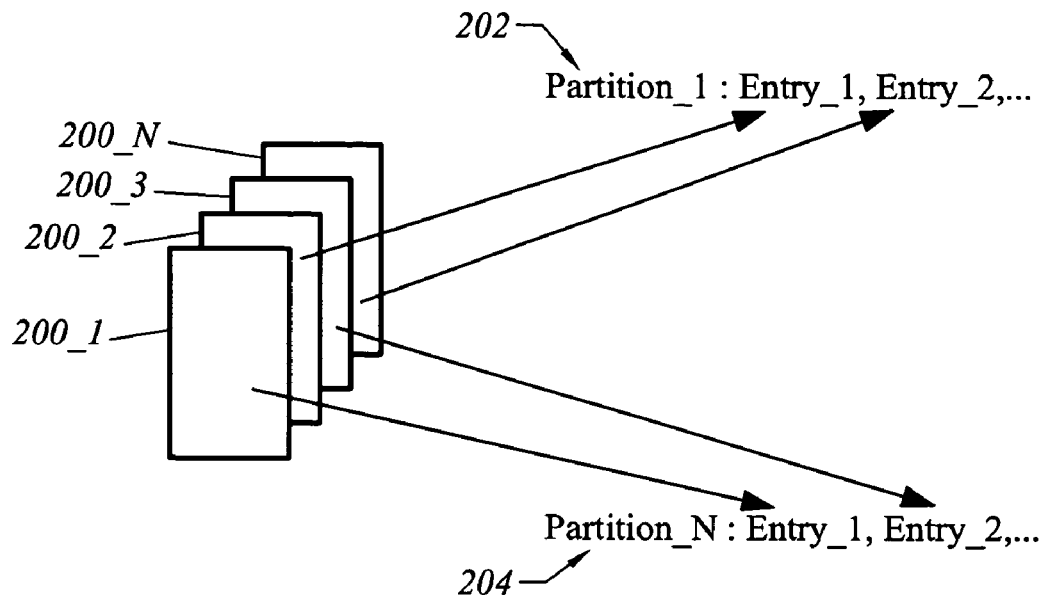
FIG. 2 illustrates the partitioning of structured documents in accordance with an embodiment of the invention.
FIG. 3 illustrates example partitions formed in accordance with an example described herein.

The partition formation operation can be more fully appreciated with reference to FIG. 2. FIG. 2 illustrates a set of documents 200_1, 200_2, 200_3, through 200_N. A first partition (Parition_1) 202 is formed with a first entry (Entry_1) from document 200_2 and a second entry (Entry_2) from document 200_N. The first entry from document 200_2 has a path segment or structure that is identical to the path segment or structure of the second entry from document 200_N. While the path segments have an identical structure, there is no pre-existing relationship between the content associated with the path segments.

Similarly, a second partition (Partition_N) 204 is formed with a first entry (Entry_1) from document 200_1 and a second entry (Entry_2) from document 200_3. Again, the first entry from document 200_1 has a path segment or structure that is identical to the path segment or structure of the second entry from document 200_3.

This partitioning operation is more fully appreciated with the following example and reference to FIG. 3. The following example demonstrates a search in an XML context. Consider the following XML code.

```
<Customer>
    <Company-Name>Raining Data Corporation</Company-Name>
    <Address>
        <Street>17500 Cartwright Road</Street>
        <City>Irvine</City>
        <State>CA</State>
        <Zip>92604</Zip>
    </Address>
    <Billing-Address>
        <Street>P.O. Box 155</Street>
        <City>Irvine</City>
        <State>CA</State>
        <Zip>92604</Zip>
    </Billing-Address>
</Customer>
```

Now consider the following query.

/Customer[Company-Name='Raining Data Corporation']/Address/City

The bold section of the XML code below corresponds to the foregoing query.

```
<Customer>
    <Company-Name>Raining Data Corporation</Company-Name>
    <Address>
        <Street>17500 Cartwright Road</Street>
        <City>Irvine</City>
        <State>CA</State>
        <Zip>92604</Zip>
    </Address>
    <Billing-Address>
        <Street>P.O. Box 155</Street>
        <City>Irvine</City>
        <State>CA</State>
        <Zip>92604</Zip>
    </Billing-Address>
</Customer>
```

To reach the answer "<City>Irvine</City>", the invention matched the structure of the query to the structure and content of the original XML document. As shown in FIG. 3, the original XML document can be deconstructed into a set of partitions. The first partition (Partition_1) includes a "customer" tag and a "company_name" tag. In this example, "Raining Data Corporation" would be the "company_name" content for one entry in the partition. Other entries in the same partition could have different content (i.e., a different company name), but all entries in the same partition have the same structure, namely, a "customer" tag and a "company_name" tag.

The second partition (Partition_2) of FIG. 3 has a nested structure that includes a "customer" tag, an "address" tag, and a "street" tag. The content searched in this partition is the content associated with each "street" entry (i.e., street_1, street_2, etc.). Again, the content in the partition may vary, but the structure for each entry in the partition is the same, including a "customer" tag, an "address" tag, and a "street" tag.

The third partition (Partition_3) of FIG. 3 has a nested structure that includes a "customer" tag, and "address" tag, and a "city" tag. The content searched in this partition is the content associated with each "city" entry (i.e., city_1, city_2, etc.). As before, the content in the partition may vary, but the structure for each entry in the partition is the same.

The fourth partition (Partition_4) has a nested structure that includes a "customer" tag, an "address" tag, and a "state" tag. This partition has a different structure than the other partitions, but otherwise has the same partition characteristics.

The fifth partition (Partition_5) has a nested structure that includes a "customer" tag, an "address" tag, and a "zip" tag. This partition has a different structure than the other partitions, but otherwise has the same partition characteristics.

Additional partitions are created for the "Billing-Address" portion of the exemplary code shown above. Observe that for the "Billing-Address" portion of the exemplary code there are associated "street", "city", "state" and "zip" entries, as in the case of the "Address" portion. Thus, the resultant partitions represent related paths, but to find the correct information, the full, correct path must be followed. In this example, that means the path to the "city" entry through the "Address" portion, not the path to the "city" entry through the "Billing-Address" portion.

It should be appreciated that each partition, with its identical path segments, but varying content, can be rapidly searched for content. In particular, linear processing of the content can be achieved since the content from identical path segments is arranged contiguously in a row or related compact structure.

Observe that the partitioning operation of the invention deconstructs the original form of the structured documents. This stands is stark contrast to prior art techniques that endeavor to maintain the original node tree structure of structured documents. In accordance with the invention, portions of the structured documents end up in partitions that have identical path segments. While this partitioning operation involves a deconstruction and re-ordering of structured documents, this original computational burden results in an organizational structure that subsequently facilitates rapid searching. The computational expedience provided by the rapid searching far outweighs the computational expense of the partitioning operation. In other words, it has been discovered that it is desirable to introduce a computational front-end burden to produce partitions so that the linear processing of content provided by the partitions can be exploited.

Figure 4:
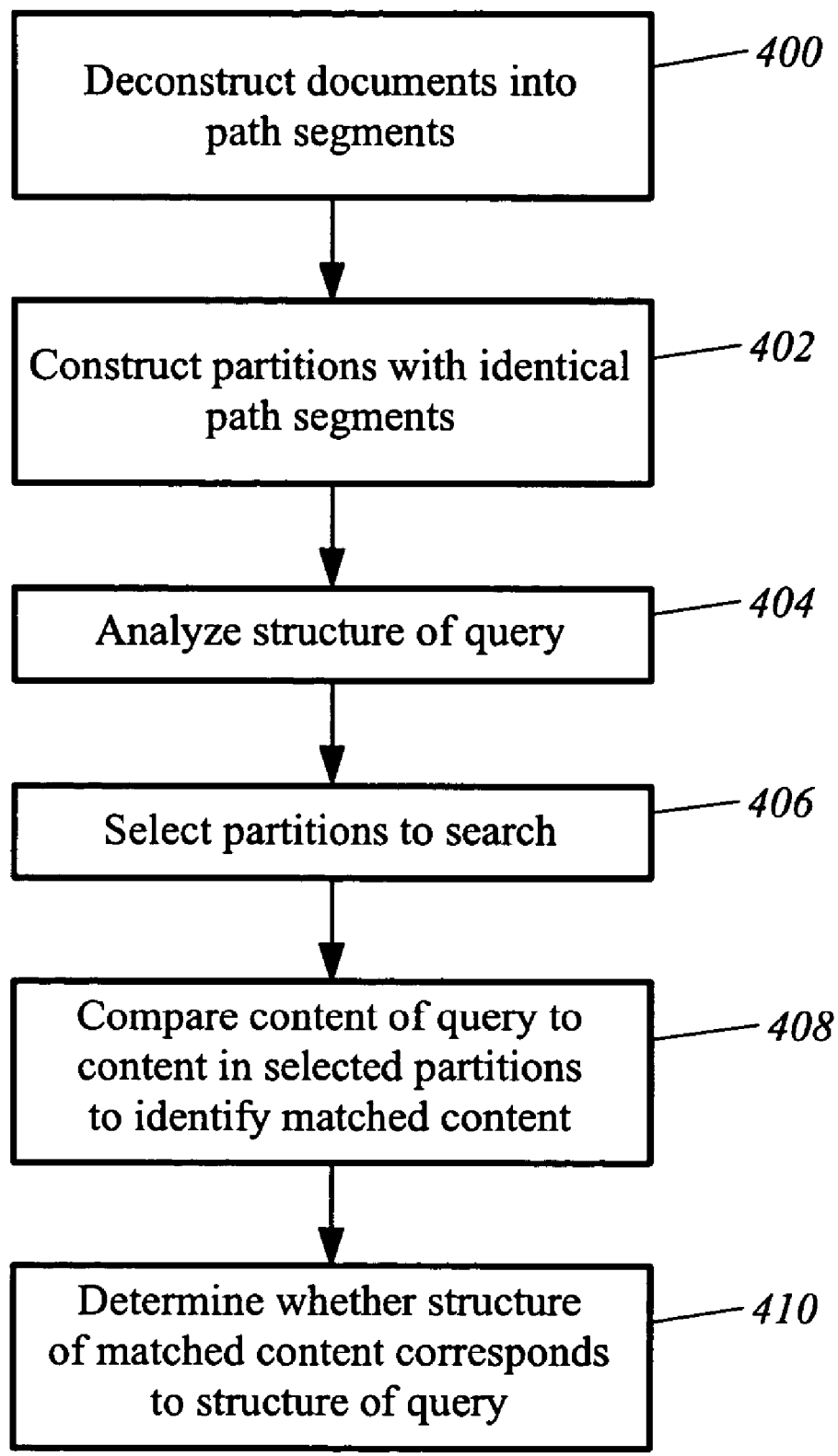
FIG. 4 illustrates processing operations performed in accordance with an embodiment of the invention.

FIG. 4 illustrates processing operations associated with an embodiment of the invention. The first processing operation of FIG. 4 is to deconstruct documents into path segments (block 400). Next, partitions are constructed with identical path segments (block 402). These operations are consistent with the foregoing discussion in connection with FIGS. 2-3.

These operations are implemented with the executable instructions associated with the document partitioner 112.

The next processing operation of FIG. 4 is to analyze the structure of a query (block 404). This operation is implemented with executable instructions associated with a query processor 116, as shown in FIG. 1. The query processor 116 includes a structure analyzer 118, which assesses the structure of a query, as fully described below.

The next processing operation of FIG. 4 is to select partitions to search (block 406). The executable instructions associated with a partition selector 120 may be used to implement this operation. Unlike the prior art that traverses a node tree structure to identify content matches, the invention selects individual partitions to identify content matches. Based upon the structure of the query, a small sub-set of partitions is selected for searching. Search paths through partitions inconsistent with the structure of the query are eliminated prior to searching. Through this technique, the vast majority of the potential search space is eliminated, thereby producing significant acceleration in search speeds. For those partitions that are selected for searching, linear searching of the content is achieved through the ordered structure of the partitions. This linear search of the content further accelerates overall search time.

The next processing operation of FIG. 4 is to compare the content of the query to the content in selected partitions to identify matched content (block 408). This operation may be implemented with executable instructions of a content matcher 122 of FIG. 1.

The final processing operation of FIG. 4 is to determine whether structure of the matched content corresponds to structure of the query (block 410). Executable instructions of the structural comparison module 124 of FIG. 1 may be used to implement this operation. Recall that the prior art traverses a node tree structure to find matched content. In contrast, the invention searches path segments arranged in partitions to identify content. Once matched content is identified in this manner, structural correspondence between the content and the query is performed. In accordance with the invention, indirect or inferred structural processing is used. That is, instead of relying upon explicit structural definitions for a node tree, relationships are inferred, and therefore certain node relationships can be ignored. In particular, node relationships that do not pertain to a solution set are ignored. Thus, the technique of the invention focuses on significant nodes and ignores insignificant nodes to enhance processing speed. This operation is more fully appreciated in connection with examples provided below.

When the structural comparison module 126 determines that matched content structural attributes correspond to the structure of the query, an answer to the query exists. That is, the query has been matched to a segment of one or more documents. This segment can now be supplied to the user. Alternately, the entire document associated with the segment can be supplied to the user. In the latter case, executable instructions of a document reintegration module 126 are used to reconstruct the document from the partitioned information. Techniques for reconstructing deconstructed documents are well known in the art.

The operations associated with the invention have now been fully described. These operations are more fully appreciated in connection with more specific examples, which are provided below. The specific examples are provided in the context of a discussion of theoretical aspects associated with the technology of the invention. These theoretical aspects rely upon a set of definitions, which are provided below. While the following discussion relies upon XML as an example, it should be appreciated that the techniques of the invention are applicable to other markup languages.

Definition: A problem-set for a query is the set of XML document upon which the query is being performed. This set is always assumed to contain one or more documents.

Definition: A solution-set for a query is the set of complete sub-trees of documents in the problem-set that match the criteria laid out in the query.

Definition: A restriction is any condition placed on a query that seeks to reduce the size of the solution-set for that query.

Definition: A context for a given restriction is the scope of that restriction. As an example, if we seek all parents whose children are under the age of six, the restriction is on children, while the context is the parent.

Definition: Two nodes A and B are related if either A is ancestral to B or A is descendant to B. A node is ancestral if it can be reached by following a series of one or more parent nodes. A node is descendant if it can be reached by following a series of one or more child nodes.

Definition: The full-path of a node is the ordered series of names of all ancestors of the given node and its own fully qualified name. For example, the full-path of the City node in the example associated with FIG. 3 is /Customer/Address/City.

Definition: Two nodes A and B are considered like if they have the same full-path.

Given this definition of like nodes, all such nodes are stored contiguously in a single row. In turn, all such fields are appended to one another to construct the instance document. Row positions are controlled by the document type such that /Customer/Address/City would be stored in the same row for all instance documents (see, for example, Partition_3 of FIG. 3).

In addition, each row contains a sibling row. For example, observe in FIG. 3 that each adjacent partition has common ancestors, but different terminal nodes.

In order to minimize search time, it is desirable to minimize the search space. This minimizes the amount of data that actually needs to be read from the disk and restricted (processed). As previously indicated, all like nodes are stored contiguously. This ensures efficient processing since all nodes of a particular type may be processed serially. In turn, query performance can be greatly improved by reducing the number of such rows that must be processed to the minimal set required to process the query. Simply put, if the query is only concerned with 10% of a document, only 10% (or less) of a document should be considered.

Additional processing associated with the invention is more fully appreciated in connection with the following additional definitions.

Definition: An axis is a direction of search. For instance, the descendant axis searches all nodes in the sub-tree anchored at the current context.

Definition: A step in a query is a combination axis, name and optional predicate. In turn, a query is composed of a series of steps, which can be considered logical traversals of the problem-set.

Definition: A meta-reference is a data descriptor that maps a context, node pair to a particular row in the data store.

Definition: The pseudo-root of a given document type is a logical root node that anchors every logical root node in the document type. For instance, a document type may contain two root nodes, root and top, which would in turn both have the pseudo-root as their parent.

In view of the foregoing definitions, the following example illustrates the operation of the structure analyzer 118 associated with the query processor 116. Consider the following query.

//A[B and C]/D[E or F]

Processing is initiated with a base set of meta-references. This base set contains only the pseudo-root. Start with the //A step. This step matches any A node that is descendant to the pseudo-root, which will include any node named A in any document. For illustration purposes, assume that the test matches four separate A nodes.

/root1/A
/root2/A
/root3/A
/root4/A

The first predicate is therefore associated with a new base set containing four references (to the aforementioned nodes). The predicate is then processed with the test for B. This new test is in the context of the four previous references. Consider four successful matches.

/root1/A/B
/root2/A/B
/root3/A/B
/root4/A/B

In this context, a match to C nodes is initiated. Suppose that in this instance only three of the four have a viable C node.

/root1/A/C
/root2/A/C
/root3/A/C

Since the fourth reference does not match, and since inclusive logic (logical AND) is being used, it cannot possibly match any portion of the solution-set, so the selection is discarded from the query. This demonstrates partition selection, since the invalidation of the fourth A also effectively removes the fourth B reference. As such, there are now only three B partitions and three C partitions that need to be searched.

Next there is a test against a base set of references containing three meta-references. In this example, there are only two-matching D's.

/root1/A/D
/root2/A/D

Since D is a step, the third reference is invalidated, which in turn invalidates additional B and C tests in the previous predicate. As such, the search space is reduced to two B's and two C's. The base reference set now has two D references. Processing proceeds to the second predicate.

The E test establishes that only one node matches in the context of the current reference set.

/root1/A/D/E

However, since exclusive logic (logical OR) is being used, nodes are not invalidated at this point. A test of the F condition is initiated. In this example, there are two matches.

/root1/A/D/F
/root2/A/D/F

Since both base-references match, both contexts are preserved and the F test has two meta-references.

What is accomplished in this process is the elimination of all search paths or partitions that cannot be valid in instance documents. Note that this is accomplished without performing any search. The processing technique ensures that local search spaces are ignored if they are invalid in a global context. For instance, in the absence of the technique of the invention, one may have searched /root4/A/B since it is a valid test locally, even though it can never actually be a part of the solution-set.

Thus, a meta-reference set is applied to each step in the query. Each set refers to a series of meta-references. Each meta-reference refers not only to a data descriptor, but also maintains backward links to its meta-reference set and its parent meta-reference. These links are used to back-patch invalid sets, thereby removing any dead links. This technique provides a static approach to determining an optimal search path for the query.

As previously indicated, like nodes are arranged contiguously. This allows like nodes to be processed simultaneously. Nonetheless, this efficiency comes at a certain cost, and that is in structure. In order to process these nodes contiguously, knowledge of each node's relationship to any other node is lost. Since XML is semi-hierarchical, it is necessary to search structure as well as content in order to properly recognize the solution-set. The following example illustrates this concept. Consider the following two documents.

```
<Customers>
    <Customer Company-Name="Raining Data Corporation">
        <Address>
            <Street>17500 Cartwright Road</Street>
            <City>Irvine</City>
            <State>CA</State>
            <Zip>92604</Zip>
        </Address>
    </Customer>
    <Customer Company-Name="XYZ Corporation">
        <Address>
            <Street>123 ABC Street</Street>
            <City>Newport Beach</City>
            <State>CA</State>
            <Zip>92612</Zip>
        </Address>
    </Customer>
</Customers>
```

Now consider the following query.

//Customer[@Company-Name='XYZ Corporation' and Address/City='Irvine']

This query results in the following highlighted matches.

```
<Customers>
    <Customer Company-Name="Raining Data Corporation">
        <Address>
            <Street>17500 Cartwright Road</Street>
            <City>Irvine</City>
            <State>CA</State>
            <Zip>92604</Zip>
        </Address>
    </Customer>
    <Customer Company-Name="XYZ Corporation">
        <Address>
            <Street>123 ABC Street</Street>
            <City>Newport Beach</City>
            <State>CA</State>
            <Zip>92612</Zip>
        </Address>
    </Customer>
</Customers>
```

This query demonstrates that while multiple restrictions may return results, those results may not pertain to the same context. In other words, while content matches may occur, if the structural position of those content matches is erroneous, then the matches represent bad data. As such, it is necessary to maintain context such that relationships can be re-mapped in an arbitrary manner. Consider the following definition.

Definition: A node address is an arbitrary-length, dotted-notation address unique to a particular node in an instance document. Each component of the address is a coordinate in n-space, where n is the depth of the deepest leaf node in the document. Each coordinate defines the contextual-ordering of the node.

As an example, the node address 1.2.3 describes the third child of the second child of the first node in the document. Given that each node in a document has such an address and that the address is unique, exact relationships between two nodes can be determined. For instance, given node addressing, it is known that 1.2.3 and 1.2.4 share a common parent (and thus a common grandparent). It is also known that 1.2 is an ancestor of 1.2.4.5.6. Further, this concept can be expanded to say that given restrictions on any m rows in a given context, structural matches can be determined by performing a linear intersection of the matches using node addressing.

Re-consider the query:

//Customer[@Company-Name='XYZ Corporation' and Address/City 'Irvine']

Now, re-consider the associated documents that are supplemented to include node addressing.

```
<Customers (1)>
    <Customer (1.1) Company-Name(1.1.1)=
    "Raining Data Corporation">
        <Address(1.1.2)>
            <Street(1.1.2.1)>17500
            Cartwright Road(1.1.2.1.1)</Street>
            <City(1.1.2.2)>Irvine(1.1.2.2.1)</City>
            <State(1.1.2.3)>CA(1.1.2.3.1)</State>
            <Zip(1.1.2.4)>92604(1.1.2.4.1)</Zip>
        </Address>
    </Customer>
    <Customer(1.2) Company-Name(1.2.1)="XYZ Corporation">
        <Address(1.2.2)>
            <Street(1.2.2.1)>123 ABC Street(1.2.2.1.1)</Street>
            <City(1.2.2.2)>Newport Beach(1.2.2.2.1)</City>
            <State(1.2.2.3)>CA(1.2.2.3.1)</State>
            <Zip(1.2.2.4)>92612(1.2.2.4.1)</Zip>
        </Address>
    </Customer>
</Customers>
```

It can now be appreciated that in the context of Customer (depth 2), that 1.1.2.2 and 1.2.1 do not match, and therefore we know that neither content restriction is a part of the solution-set.

Thus, using node addressing, structure can be re-mapped using the following rules.

If two restrictions are inclusive (logical AND), they are valid if and only if the intersection of their node addresses to the depth of their context exists.

If two restrictions are exclusive (logical OR), they are valid if and only if the union of their node addresses to the depth of their context exists.

The solution-set of a query is the result of taking the node address results of each predicate and determining the intersection of each increasing set versus its previous set. For instance, using the query /A[B]/C[D], we would determine the result by retaining all those node addresses from C that also exist in A.

Using node addressing, a query thus proceeds as follows.

```
for each step
    for each condition
        apply condition on row;
        get node addresses for successful restrictions;
        accumulate addresses via intersection or union;
    end for;
    combine address set with previous address set;
end for;
result:=set of combined addresses;
```

The set of result addresses thus defines the set of context nodes in the solution-set of the query. It should be noted that algorithmically, there are several nice properties to this model that lead to solid performance gains.

As stated, since like nodes are stored contiguously, performance is far superior to random-access methods.

It can be demonstrated that node addresses for a particular series of like nodes are always in sorted order. This is a side effect of document ordering. As such, one can always perform an intersection or union between two series of node addresses in linear time instead of quadratic time, which significantly enhances processing speed.

Since node addressing can determine the relationship between ANY two nodes in a document, one can ignore intervening nodes between divergent restrictions. For instance, /A/B[C/D and E/F/G/H/I] contains conditions that traverse many intervening nodes. Node addressing allows one to avoid all of those intervening nodes and concentrate on those that need to be inspected. This is a huge speed savings in CPU and disk bandwidth.

Thus, node addressing allows one to disregard structure until it is absolutely necessary. In so doing, it is possible to reduce the amount of data that must be processed. Thus, if only 10% of the data being searched is pertinent, one should not traverse 90% of the node relationships that will never pertain to the solution-set. The current invention achieves those types of processing efficiencies, which are not available in the prior art.

Node addressing has two main shortcomings: (1) bulkiness and (2) intersection/union processing times. Bulkiness reflects the fact that for pathological documents, node address lengths can grow quite large. Further, while processing times for intersection and union are quite efficient, superior efficiency can be mined using more sophisticated techniques.

The following series of definitions and theorems support alternate structural processing operations. Given any node in a document, one can traverse its entire sub-tree by performing a linear scan of the meta-field starting from that node and proceeding until the next node of equal or lesser depth. This scan always results in a complete and contiguous sub-tree. This follows from document order and demonstrates that the data maintains spatial cohesion. With this cohesion one can determine if any node is related to another by observing whether either is contained within the other's span.

Nonetheless, it is desirable to avoid linear scans if possible because there exists a large set of queries for which a linear scan would become inefficient. Consider a query on the root where a condition is applied to the last node in the document. This query would require a complete linear scan for every document in the database.

There exists another property of the data format that follows from both spatial cohesion and node uniqueness. Two nodes are related if either is contained in the other's span. If a span is considered to be a range of node indices, one can utilize the following definitions and theorems.

Definition: A node A is descendant to a node B if A occurs at some point in the sub-tree formed with B as its root.

Definition: A node A is ancestral to a node B if B occurs at some point in the sub-tree formed with A as its root.

Definition: A node A is related to a node B if either A is ancestral to B or A is descendant to B.

Definition: The node index of a given node is its document ordering given that the root is at index 1 and all subsequent nodes are counted incrementally.

Given these definitions, the following theorem relates the span formally to node relationships.

Span Theorem: Given nodes A and B with node indices $index_A$ and $index_B$ and spans $span_A$ and $span_B$, A is related to B if and only $index_A < index_B < (index_A + span_A)$ or $index_B < index_A < (index_B + span_B)$.

This theorem demonstrates that one can re-map a node relationship given node indices and a single span. Nonetheless, this still constitutes an algorithm linear in the number of nodes since it is necessary to find both indices and the span of at least one. It is desirable to only search the minimal set of data and avoid the potentially expensive linear span calculation since this can become pathological. To accomplish this, a few more concepts are introduced.

Definition: A node A is potentially ancestral to a node B if either this A or some other like node is ancestral to A. The definition of potentially descendant follows from this.

Context Theorem: Given nodes $A_0$, $A_1$ and B, where $A_0$ and $A_1$ are potentially ancestral to B, $A_0 < B < A_1$ implies that B is descendant to $A_0$.

This theorem follows from the fact that for a node whose full-path is /A/B, there must exist at least one /A that is ancestral. Further, since each full path is assigned a unique field, the ancestor must appear in that field. The rest follows from the span theorem.

What is nice about this property is that it is compatible with node addressing implementations. Instead of maintaining a dotted-notation node address, a contextual dependency on the context node is maintained.

As an illustration, consider the query /A[B=2]. This query can be performed by scanning the A field in concert with the B field. The algorithm is seeded with the first A as current and the second A as next. The B's are then linearly scanned until an instance identifier greater than next is identified. The equality comparison with the number 2 is performed with each iteration. If any such value matches before the current span is exceeded, this A is marked as accepted. If no match occurs, this A is dropped. One proceeds by setting current to next, and next to the next instance identifier in the A sequence.

Additional criteria can be applied in a similar manner. For each criterion, the restricted context set from the previous set is used. Similarly, query steps are mapped by performing a restriction on the next context based on the current context.

The final result of this execution model is a series of integer instance identifiers that denote the results of the query. This process has the following performance benefits.

Using 4-byte integers saves space, which translates to less disk bandwidth.

Intersection and union use integer comparison instead of node-address comparison. An integer comparison can be performed in less than a clock cycle while a node address comparison typically takes several hundred clock cycles.

The final integer result can be used as an index into the meta-table for reconstruction purposes. This is much faster than analogous prior art methods.

This new model makes intersection and union implicit in data traversal instead of a secondary step.

Integer intersection and union is more space-efficient since each component in the intersection is fixed width. Therefore, buffers can be re-used for space and time savings.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions. A computer readable storage medium includes CD-ROM, hard disk, floppy disk, ROM, RAM and magnetic tape.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method of answering a query, comprising:

deconstructing documents into individual portions defining path segments;

re-ordering the documents as contiguous identical path segments with different document portions to form a set of partitions, wherein each partition has an identical nested hierarchical tag structure with varying content from different documents and wherein each nested hierarchical tag structure is a portion of hierarchical tag structure of an original document;

analyzing the hierarchical tag structure of a query with markup language tags;

selecting, based upon said analyzing, a sub-set of partitions for searching, wherein the selecting includes invalidating search paths through partitions inconsistent with the hierarchical tag structure of said query, such that the sub-set of partitions represents a minimal set of partitions required to process said query;

comparing content from said query to content within said sub-set of partitions to identify matched content, said matched content having associated structural attributes; and determining whether said matched content structural attributes correspond to the hierarchical tag structure of said query to identify an answer for said query, wherein the determining includes determining whether said matched content structural attributes have an associated node tree path corresponding to a node tree path segment associated with said query, and further determining whether said matched content has an associated node tree path segment with a subset of nodes corresponding to said node tree path segment associated with said query, wherein the deconstructing, the re-ordering, the analyzing, the selecting, the comparing and the determining are performed with a computer.

2. The method of claim 1 wherein deconstructing includes forming node tree path segments.

3. The method of claim 1 wherein determining includes determining whether said matched content has an associated node tree path segment with a subset of nodes identified through node addresses.

4. The method of claim 1 wherein determining includes determining whether said matched content has an associated node tree path segment with a subset of nodes identified through span criteria.

5. The method of claim 1 wherein determining includes determining whether said matched content has an associated node tree path segment with a subset of nodes identified through context criteria.

6. A computer implemented method of answering a query, the method comprising:

deconstructing documents into individual portions defining path segments;

re-ordering the documents as contiguous identical path segments with different document portions to form a set of partitions, wherein each partition has an identical nested hierarchical tag structure with varying content from different documents and wherein each nested hierarchical tag structure is a portion of hierarchical tag structure of an original document;

mapping the query with markup language tags to a selected partition of said set of partitions, wherein the mapping includes invalidating search paths through partitions inconsistent with the hierarchical tag structure of said query, such that a sub-set of partitions represents a minimal set of partitions required to process the query;

designating content within said query that matches content in said selected partition as matched content; and supplying an answer to said query when said matched content structurally corresponds to said query, wherein the supplying includes supplying an answer to said query when said matched content has an associated node tree path segment corresponding to a node tree path segment associated with said query, and wherein supplying includes supplying an answer to said query when said matched content has an associated node tree path segment with a subset of nodes corresponding to said node tree path segment associated with said query;

wherein the deconstructing, the re-ordering, the mapping, the designating and the supplying are performed with a computer.

7. The method of claim 6 wherein deconstructing includes partitioning documents into node tree path segments.

8. The method of claim 7 wherein partitioning includes partitioning markup language documents into node tree path segments.

9. The method of claim 8 wherein partitioning includes partitioning Extensible Markup Language (XML) documents into node tree path segments.

10. The method of claim 6 wherein invalidating includes applying a structural reference to each step associated with said query.

11. The method of claim 10 wherein invalidating includes tracking links to parent structures associated with said query.

12. The method of claim 6 wherein mapping includes invalidating node tree path segments of node tree path structures stored in sorted order.

13. The method of claim 6 wherein supplying includes supplying an answer to said query when said matched content has an associated node tree path segment with a subset of nodes identified through node addresses.

14. The method of claim 6 wherein supplying includes supplying an answer to said query when said matched content has an associated node tree path segment with a subset of nodes identified through span criteria.

15. The method of claim 6 wherein supplying includes supplying an answer to said query when said matched content has an associated node tree path segment with a subset of nodes identified through context criteria.

16. A computer readable storage medium, the computer readable storage medium comprising:

a document partitioner with executable instructions to
deconstruct documents into individual portions defining path segments, and
re-order the documents as contiguous identical path segments with different document portions to form a set of partitions, wherein each partition has an identical nested hierarchical tag structure with varying content from different documents and wherein each nested hierarchical tag structure is a portion of hierarchical tag structure of an original document; and a query processor with the executable instructions to
analyze the hierarchical tag structure of a query with markup language tags,
select a sub-set of partitions to search, wherein the executable instructions to invalidate search paths through partitions inconsistent with the hierarchical tag structure of said query, such that the sub-set of partitions represents a minimal set of partitions required to process said query,
match content from said query to content within said sub-set of partitions to identify matched content, said matched content having associated structural attributes, and
compare said matched content structural attributes to the hierarchical tag structure of said query to identify an answer to said query, wherein the executable instructions to determine whether said matched content structural attributes have an associated node tree path corresponding to a node tree path segment associated with said query, and the executable instructions to determine whether said matched content has an associated node tree path segment with a subset of nodes corresponding to said node tree path segment associated with said query, wherein said deconstructing, re-ordering, analyzing, selecting, comparing and determining are performed with a computer.

17. The computer readable storage medium of claim 16, wherein said document partitioner includes executable instructions to form tree node path segments.

18. The computer readable storage medium of claim 16 wherein said query processor includes executable instructions to determine whether said matched content has an associated node tree path segment with a subset of nodes identified through node addresses.

19. The computer readable storage medium of claim 16 wherein said query processor includes executable instructions to determine whether said matched content has an associated node tree path segment with a subset of nodes identified through span criteria.

20. The computer readable storage medium of claim 16 wherein said query processor includes executable instructions to determine whether said matched content has an associated node tree path segment with a subset of nodes identified through context criteria.

* * * * *